United States Patent [19]

Semrau

[11] Patent Number: 4,901,395
[45] Date of Patent: Feb. 20, 1990

[54] SELF-SEALING HEAT ACTIVATED GROMMET

[75] Inventor: Waldemar R. Semrau, Romeo, Mich.

[73] Assignee: General Motors Corporation, Detroit, Mich.

[21] Appl. No.: 316,128

[22] Filed: Feb. 27, 1989

[51] Int. Cl.$^4$ ............................................. B65D 53/06
[52] U.S. Cl. ............................................. 16/2; 248/56; 174/152 G; 174/153 G; 174/65 G; 174/DIG. 8; 277/178; 277/26; 264/230; 264/319; 264/345
[58] Field of Search ............ 16/2; 248/56; 174/65 G, 174/152 G, 153 G, 167, DIG. 8; 277/178, 26; 264/230, 321, 345, 319; 24/141, 142; 403/194, 197, 238

[56] References Cited

U.S. PATENT DOCUMENTS

| Re. 19,840 | 1/1936 | Woodall | 296/70 |
|---|---|---|---|
| 2,892,013 | 5/1955 | Gomberg | 174/153 |
| 3,244,802 | 4/1966 | Sturtevant et al. | 174/153 |
| 3,518,359 | 6/1970 | Trimble et al. | 174/153 |
| 3,758,916 | 9/1973 | Wetmore | 16/2 |
| 3,793,672 | 2/1974 | Wetmore | 16/2 |
| 3,990,661 | 11/1976 | De Groef | 16/2 |
| 4,041,241 | 8/1977 | Olmstead et al. | 174/153 |
| 4,043,022 | 8/1977 | Kisuna et al. | 174/153 |
| 4,232,712 | 11/1980 | Squires | 174/153 G |
| 4,383,692 | 5/1983 | Proctor | 277/178 |
| 4,797,513 | 1/1989 | Ono et al. | 248/56 |

FOREIGN PATENT DOCUMENTS 2057084 3/1981 United Kingdom ............... 264/230

OTHER PUBLICATIONS

Search Report dated Jun. 23, 1988.

Primary Examiner—Nicholas P. Godici
Assistant Examiner—Edward A. Brown
Attorney, Agent, or Firm—Charles E. Leahy

[57] ABSTRACT

According to the present invention an elastomeric grommet includes an axial extending central tubular portion of diameter less than the diameter of the compartment wall opening. A flange portion is integral with the central tubular portion and has a diameter greater than the diameter of the compartment wall opening to limit the extent of insertion of the tubular portion into the compartment wall opening. A retention means, such as a flexible annular lip, is integral with the central tubular portion in axial spaced relation from the flange portion and has a free state dimension which is greater than the diameter of the central tubular portion. The integral retention device is yieldable to permit its insertion and the insertion of the tubular central portion through the compartment wall opening and then returns to its free state condition to retain the grommet in loose fitting relation with the compartment wall. An annular ring of heat expanding material is carried by the grommet and expands in response to the occurrence of a predetermined temperature condition to fill the space between the grommet and the compartment wall and thereby seal the compartment wall opening.

5 Claims, 1 Drawing Sheet

SELF-SEALING HEAT ACTIVATED GROMMET

The invention relates to a grommet for sealing a wire, rod or tube passing through an opening in the compartment wall of a vehicle body and more particularly provides a grommet having an annular ring of heat activated material expanding to seal the grommet to the compartment wall.

BACKGROUND OF THE INVENTION

It is well known in vehicle bodies to provide a compartment wall, such as a compartment wall between the passenger compartment and the engine compartment. Various wires, control rods, tubes and other vehicle component elements pass through various openings provided in the compartment wall. It is well known to provide elastomeric grommets which have a central passage therethrough for sealingly receiving the wire rod or tube, and which are installed into the compartment panel opening in a manner providing an effective sealing relationship between the compartment wall and the wire, rod, tube or other elongated member.

The prior art has recognized that it is desirable to provide a grommet which is easy to install and yet, once installed, provides a substantial retention force between the grommet and the compartment wall so that the grommet will not become dislodged from sealing engagement.

It would be desirable to provide a new and improved grommet which would be easy to install by having a loose fitting relationship with the compartment wall, and would then subsequently be self-energized in response to heating thereof to obtain an effective sealing and retaining relationship with the compartment wall.

SUMMARY OF THE INVENTION

According to the present invention an elastomeric grommet includes an axial extending central tubular portion of diameter less than the diameter of the compartment wall opening. A flange portion is integral with the central tubular portion and has a diameter greater than the diameter of the compartment wall opening to limit the extent of insertion of the tubular portion into the compartment wall opening. A retention device, such as a flexible annular lip, is integral with the central tubular portion in axial spaced relation from the flange portion and has a free state dimension which is greater than the diameter of both the central tubular portion and the compartment wall opening. The integral retention device is yieldable to permit its insertion and the insertion of the tubular central portion through the compartment wall opening and then returns to its free state condition to retain the grommet in loose fitting relation with the compartment wall. An annular ring of heat expanding material is carried by the grommet and expands in response to the occurrence of a predetermined temperature condition to fill the space between the grommet and the compartment wall and thereby seal the compartment wall openinng.

Accordingly, the object, feature and advantage of the invention resides in the provision of a compartment wall grommet for a vehicle body in which the grommet is deliberately undersized with respect to the diameter of the compartment wall opening to facilitate ease of insertion of the grommet and the grommet carries an annular ring of heat expanding foam type material which is expanded in response to application of a high temperature condition in order to expand and the fill the remaining space between the grommet and the compartment wall whereby an effective retention and sealing of the grommet is obtained.

Another object, feature and advantage of the invention resides in the provision of a compartment wall grommet in which the a central portion of the grommet is undersized with respect to the compartment wall opening and an integral retention device of the grommet retains the grommet in loose fitting relation in the opening until an annular ring of heat expanding material carried by the grommet is heated and expands the effective size of the grommet to fill and seal the compartment panel opening.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
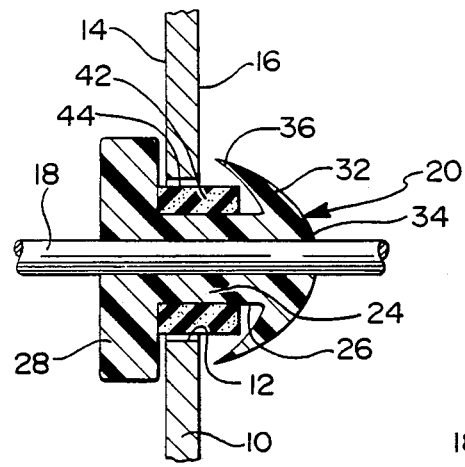
FIG. 1 is a side elevation view of a first embodiment of a grommet shown in loose fitting installed relationship with the compartment wall.

Referring to FIG. 1 there is shown a vehicle compartment wall 10 of stamped metal having an opening 12 formed therein. The compartment wall 10 separates the passenger compartment of the vehicle from the engine compartment. The compartment wall 10 includes opposite facing first and second surfaces 14 and 16, one of which faces the passenger compartment and the other of which faces the engine compartment. An elongated member 18, which may be a tube, a wire, a control rod, or some other element of the motor vehicle, passes through the opening 12 between the passenger compartment and the engine compartment. The compartment wall opening 12 is substantially larger than the size of the elongated member 18 and an elastomeric grommet 20 is provided to seal the elongated member 18 with the compartment wall 10.

As seen in FIG. 1, the grommet 20 is a molded elastomeric member of resilient material and includes a central tubular portion 24 having an outer surface 26 of less diameter than the compartment panel opening 12, an end flange 28 integral with the central tubular portion 24 and having a diameter substantially larger than the compartment wall opening 12, and an annular retaining lip structure 32 formed integral with the grommet 20 and spaced axially from the flange 28. The retaining lip structure 32 has an outer end 34 which presents a tapered conical surface or conical proboscis 34 and terminates at an annular circular lip structure 36 having a free state molded condition which is diametrically greater than the diameter of the compartment wall opening 12. Accordingly, it will be appreciated that the elastomeric grommet 20 may be inserted through the compartment wall opening 12 by pressing the conical proboscis 34 against the compartment wall opening 12 and then forcing the grommet 20 axially in the rightward direction as viewed in FIG. 1 so that the flexible retaining lip structure 32 yields radially inward due to progressive engagement with the compartment wall opening 12. When the grommet 20 reaches the installed position of FIG. 1, the annular retaining lip structure 32 is enabled to expand radially outward to its free state molded condition in which the lip 36 obtains its diametrical free state exceeding the diameter of the compartment wall 12 to prevent the grommet 20 from returning leftwardly and egressing from the compartment wall opening 12. Thus, it is seen that the grommet 20 has obtained a loose fitting relationship with the compartment wall 10.

Referring again to FIG. 1, it is seen that the grommet 20 carries an annular ring 42 of heat expandable material. Annular ring 42 encircles the tubular body portion 24 and has an outer surface 44 which is less in diameter than the compartment wall opening 12 to facilitate the ease of installation of the grommet 20 through the compartment wall opening 12. The annular ring 42 is preferably an expanding rubber base compound designed to expand at a predetermined temperature substantially above the ambient temperature experienced by the grommets prior to their installation in the vehicle body and to expand in response to air temperatures such as generated by ovens used in processing vehicle bodies or the temperatures which may be generated by the vehicle engine heating the engine compartment.

One example of a suitable material for the annular ring 42 is the line of sealants manufactured by Ciba-Geigy under the trademark ARASEAL.

Figure 2:
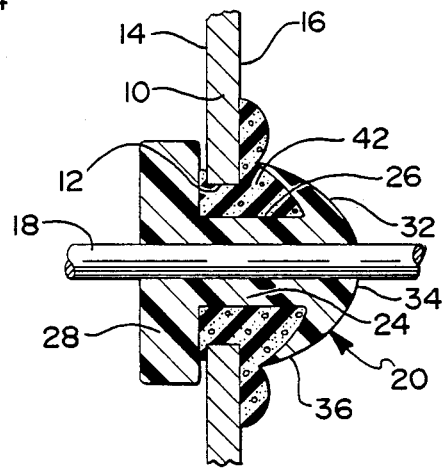
FIG. 2 shows the grommet of FIG. 1 having been subjected to a high temperature condition in which the annular foam ring carried by the grommet has expanded to seal with the compartment wall.

As best seen in FIG. 2, the application of the predetermined temperature condition to the grommet 20 causes the annular ring 42 to expand to fill the space between the grommet 20 and the compartment panel 10. As seen in FIG. 2, the annular ring 42 expands both radially outward and axially so that the expanded material substantially fills both the radial dimension between the outer surface 26 of the central tubular portion 24 and the compartment wall 12. In addition, the annular ring 42 expands in the axial direction to fill the space between the retaining lip structure 32 and the flange 28 in tight fitting sealing relationship with both the surfaces 14 and 16 of the compartment panel 10. Accordingly, the expanding action of the annular ring 42 serves to center and position and seal and retain the grommet 20 within the compartment panel 12.

During the radial inward yielding of the retaining lip structure, the retaining lip structure overlies the annular ring 42 to protect the annular ring from abrasion with the compartment wall opening 10.

Figure 3:
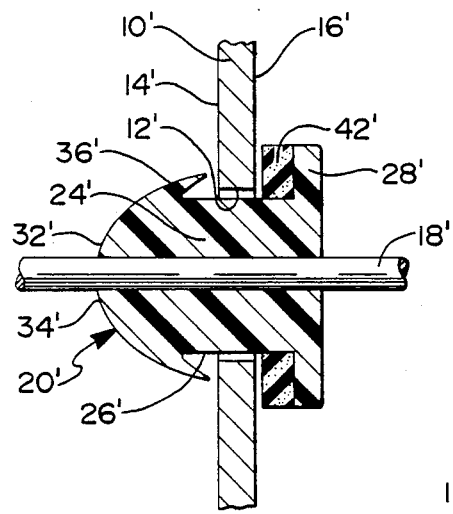
FIG. 3 is a view similar to FIG. 1 but showing a second embodiment of the grommet.
Figure 4:
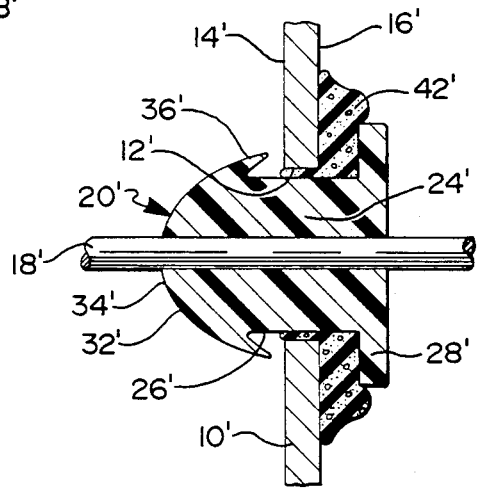
FIG. 4 shows the annular foam ring of the grommet of FIG. 3 having been heat activated to seal the grommet to the compartment wall.

FIG. 3 discloses a second embodiment of the invention and has like elements designated by like numerals. In the embodiment of FIG. 3, it is seen that the annular ring 42' has a flat washer like shape which is juxtaposed with the flange 28' of the grommet whereas in FIG. 1 the annular ring 42 had a tubular sleeve like shape which encircled the outer surface 26 of the central tubular portion 24. Accordingly, as seen in FIG. 3, the installation of the grommet 20' through the compartment opening 12' will position the annular ring 42' in juxtaposition with the surface 16' of the compartment wall 10'. Then, as shown in FIG. 4, the application of the predetermined temperature condition to the grommet 20' will cause the annular ring 42' to expand both axially and radially to flow and fill the space between the tubular body portion 24 and the compartment panel wall 12 and also fill the axial space between the flange 28 and the compartment panel 10.

It will be appreciated that the extent to which the annular ring expands and seals and retains the grommet will depend upon the expansion characteristic of the annular ring 42 and also upon the size of the annular ring. By experimentation, the designer may configure the grommet and the annular ring to provide the desired degree of retention and sealing which is appropriate for the specific vehicle condition and the nature of the elongated element 18 which passes through the grommet 20. For example, if the element 18 is a control rod which must move axially through the grommet, it may be desirable to provide a relatively large annular ring 42 which will expand more substantially to increase the degree of retention of the grommet to the compartment wall. On the other hand, if the elongated element 18 is merely a wire which will not move, a lesser degree of retention and sealing may be adequate. In order to maximize the sealing effect, the annular ring 42 may have the tubular shape of FIG. 1 surrounding the tubular portion of the grommet 20 and may also have an integral washer type configuration of FIG. 3 which would extend radially between the flange 28 and the surface of the compartment panel 10.

It will be also understood that the formulation of the expanding rubber based compound of the annular ring 42 may be modified to provide expansion thereof at a predetermined temperature. For example, the material may expand at a temperature of 150° C. if the expansion is to take place in a paint oven. On the other hand, it may be desirable to expand the annular ring 42 at a lower temperature of perhaps 40° C. to 50° C. which is conventionally generated by the operation of the engine within the engine compartment.

Thus it is seen that the invention provides a new and improved grommet for sealingly passing elongated elements through the compartment wall of a vehicle body. The grommet is configured to be easily installed in loose fitting relationship and carries an annular ring of heat expandable material which is heated during subsequent processing to expand and fill and seal and retain the grommet within the opening of the motor vehicle compartment wall.

The embodiments of the invention in which an exclusive property or privilege is claimed are defined as follows:

1. A grommet of the type for mounting in an opening in a compartment wall and including an elastomeric body having a passage therethrough for passing an elongated member through the compartment wall, such grommet comprising:

an axially extending central tubular portion of diameter less than the diameter of the compartment wall opening;

a flange portion integral with the central tubular portion and having a diameter greater than the diameter of the compartment wall opening to limit the extent of insertion of the central tubular portion into the compartment wall opening;

a retention means integral with the central tubular portion in axial spaced relation from the flange portion, said retention means having a free state dimension greater than the diameter of the central tubular portion and being yieldable to permit insertion of the tubular portion through the compartment wall opening and then returning to the free state condition to retain the grommet in loose fitting relation with the compartment wall;

and an annular ring of heat expandable material carried by the grommet, said annular ring expanding in response to occurrence of predetermined heat condition to fill the space between the grommet and the compartment wall and thereby seal the compartment wall opening.

2. A grommet of the type for mounting in an opening in a compartment wall and including an elastomeric body having a passage there through for passing an elongated member through the compartment wall, such grommet comprising:

an axially extending central tubular portion of diameter less than the diameter of the compartment wall opening;

means associated with the central tubular portion and effective upon insertion of the central tubular portion of the grommet into the compartment wall opening to loose fittingly and unsealingly retain the grommet in the compartment wall opening;

and an annular ring of heat expandable material carried by the grommet, said annular ring expanding in response to occurrence of predetermined heat condition to fill the spaced between the grommet and the compartment wall and thereby tight fittingly seal the compartment wall opening.

3. The grommet of claim 2 further characterized by the retention means integral with the central tubular portion of the grommet being an annular lip structure having a conical proboscis facilitating the entry of the grommet into the compartment wall opening and progressively contacting with the compartment wall during the progressive insertion of the grommet to yield the annular lip into overlying relation with the annular ring of heat expandable material and thereby protect the heat expanding material from abrasion by the compartment wall during insertion.

4. The grommet of claim 2 further characterized by the annular ring of heat expandable material carried by the grommet being an annular ring surrounding the central tubular portion in radial interposition between the central tubular portion and the compartment wall opening so that the annular ring expands radially to seal the grommet and the compartment wall.

5. The grommet of claim 2 further characterized the grommet having a flange portion larger that the diameter of the compartment wall opening and by the annular ring of heat expandable material carried by the grommet being an annular washer-like ring axially interposed between the flange portion and the compartment wall opening so that the annular ring expands axially to seal the grommet and the compartment wall.

* * * * *